(12) United States Patent
Pate

(10) Patent No.: US 6,274,267 B1
(45) Date of Patent: Aug. 14, 2001

(54) SEAL FOR ELECTROCHEMICAL CELL

(75) Inventor: Paul E. Pate, Branford, FL (US)

(73) Assignee: Moltech Power Systems, Inc., Alachua, FL (US)

( * ) Notice: Subject to any disclaimer, the term of this patent is extended or adjusted under 35 U.S.C. 154(b) by 0 days.

(21) Appl. No.: 09/364,556

(22) Filed: Jul. 30, 1999

(51) Int. Cl.$^7$ .............................. H01M 2/08; H01M 6/00

(52) U.S. Cl. ...................... 429/185; 429/171; 429/174; 429/163; 29/623.2

(58) Field of Search ...................... 429/174, 171, 429/185, 163; 29/623.2; 264/272.21, 271.1

(56) References Cited

U.S. PATENT DOCUMENTS

| | | | |
|---|---|---|---|
| 2,411,272 | 11/1946 | Keller | 136/133 |
| 3,096,217 | 7/1963 | Clune . | |
| 3,713,896 | * 1/1973 | Feldhake | 136/133 |
| 3,891,462 | * 6/1975 | Langkau | 136/111 |
| 4,122,242 | * 10/1978 | Feldhake | 429/174 |
| 4,523,376 | 6/1985 | Thibault et al. | 29/623.2 |
| 4,670,362 | 6/1987 | Wiacek et al. | 429/174 |
| 5,057,386 | 10/1991 | Gordy | 429/174 |
| 5,080,984 | * 1/1992 | Thibault et al. | 429/94 |
| 5,198,314 | 3/1993 | Gordy | 429/174 |

FOREIGN PATENT DOCUMENTS 30 41 246   5/1982   (DE) .

OTHER PUBLICATIONS

Patent Abstracts of Japan, vol. 013, No. 518 (Nov. 20, 1989) corresponding to JP 01 209658 A (Aug. 23, 1989).
WPINDEX abstract No. 1982–G33722E corresponding to De 3041246 A (May 1982).

* cited by examiner

Primary Examiner—Gabrielle Brouillette
Assistant Examiner—Angela J. Martin
(74) Attorney, Agent, or Firm—Sven W. Hanson; Jacqueline M. Nicol

(57) ABSTRACT

A seal and method of sealing for use in electrochemical cells and similar devices. A preformed seal assembly is produced by insert-molding a seal element about a cell cover plate. By preforming the seal element, a more effective seal geometry is produced. In particular, the seal element is formed with a low profile seal flange on the outer face of the cover plate. One benefit of this lower profile is to assist in increasing the effective capacity of the associated cell. Another benefit of the preformed seal element is that it is not necessary to grossly deform the seal element during cell assembly in order to capture the cover plate. This enables use of more desired seal materials such as amorphous polymers, particularly polysulfone. To improve the effectiveness of the seal, a seal flange and shoulder portions, between which the cover plate is captured, are each axially compressed to increase the leakage path and reduce cold flow of the seal element. The end of the cell container wall is bent inward to form a flange that is permanently biased against the seal flange to establish axial compression. The invention provides an improved method of cell assembly by reducing the seal element and cover plate to a single assembly prior to introduction in a cell. This simplifies cell fabrication and reduces waste due to improper assembly.

8 Claims, 2 Drawing Sheets

SEAL FOR ELECTROCHEMICAL CELL

BACKGROUND OF THE INVENTION

The present invention pertains to rechargeable electrochemical cells and more particularly to an improved seal and method of sealing for retaining electrolyte within the casing of a rechargeable electrochemical cell.

Many rechargeable electrochemical cells, such as nickel-cadmium and nickel-metal hydride cells are made of flexible electrode plates loaded with an electrochemically active material. The electrodes are separated by a thin nonconductive separator and the assembly is spirally wound into a cylindrical configuration and inserted into a can or other container. Electrolyte is introduced into the can and is retained within and surrounding the electrodes and separator. The cell also includes a cover that cooperates with the container to provide a sealed environment within the cell in which the various electrochemical reactions occur for storage and release of electrical energy. Due to the nature of the processes involved, the container often experiences considerable pressures, in some cells reaching several hundred pounds per square inch. It is necessary to incorporate an insulating seal material between the cover and the container wall to help seal against leakage of electrolyte from the cell at the interface between the cover and the container.

It is important that the seal associated with the above cells maintain an effective sealing function throughout the life of the cell. If the sealing function is not maintained, a number of undesirable conditions adverse to effective cell operation may result. First, evaporation of the electrolyte may result in reduced performance or failure of the cell. Second, leaking electrolyte (typically a corrosive agent) may contaminate and damage components exterior to the cell.

A variety of seal designs have been employed in past attempts at resolving the problem of leaking electrolyte in these cells. Many designs incorporate a deformable seal material that is captured and compressed between a rigid disk-like cover and the cell container walls. Maintenance of the sealing function relies on the ability to retain residual compressive stresses within the deformable yet resilient seal material. Many different combinations of seal material and geometry have been used to accomplish this. For the most part, residual compressive stresses are established by highly compressing the container wall onto or around the cover plate, compressing the seal material between. If the metal container walls are compressed past their elastic limit, they will be permanently deformed. When the external forces are withdrawn, residual stresses in the container walls maintain compression of the seal material between the walls and the cover plate. Examples of these processes are provided in U.S. Pat. Nos. 4,523,376 and 5,080,984 to Thibault et al. However, a combination of cold-flow of the seal material and gradual relaxation of the container walls often results in loss of compression and eventual leakage. Leakage of electrolyte is still a problem with most cells.

Loss of compression is addressed in part by proper selection of seal material. Seal materials for these types of cells preferably meet at least two criteria. First, the material should be capable of sustaining high compressive stress in order to maintain an effective seal. Second, the material should also be chemically inert and unaffected when surrounded by the electrolyte contained in the cell. Some amorphous polymers such as polysulfone perform better in both regards than do nylons and other crystalline polymers used in seals. Unlike crystalline polymers, polysulfone exhibits little cold flow under the stresses experienced in seal elements. Because they flow or relax very little under compression, amorphous polymers such as polysulfone are capable of providing more effective seals. The properties of these seal materials are discussed in more detail in the above patents to Thibault et al.

In a typical seal, a deformable sealing element is fabricated in a generally toroidal shape. The sealing element has an inner surface for receiving the perimeter of a circular cover plate. These two elements are brought together within the opening of the cell container. Generally, a shoulder or shelf is provided to position the seal and the end of the container wall is bent over to capture the sealing element within. The container wall is then compressed radially toward the cover plate perimeter. The portion of the sealing element in which significant compression is established is a relatively small region adjacent the perimeter of the cover plate. This relatively small region of compression is susceptible to cold-flow and gradual loss of compression. It also presents a relatively short barrier to leaking electrolyte. One method to increase this barrier is to bend the wall end over an extended portion of the seal element, crushing this portion against the outside surface of the cover plate. However, this approach is problematic. First, in bending the wall over and toward the cover plate, contact between the wall and cover plate is risked. Because the container wall and cover plate are oppositely charged when the cell is functioning, it is critical that such contact be prevented to avert shorting. The very small dimensions involved in these components and the difficulty of holding close tolerances in a commercial production environment increase this problem. Secondly, not all seal materials can be so crushed and deformed as described. Seal elements formed of crystalline polymers such as nylon can be deformed in the manner required to form such seals. However, polysulfone and similar materials that are more desirable otherwise as a seal material cannot be used in this manner due to their higher strength and hence resistance to plastic forming. If the more desired polysulfone is to be used as a seal material, another seal design must be used. What is needed is a seal design that provides an increased barrier to electrolyte leakage past the seal element and takes advantage of the greater performance of polysulfone as a seal material.

SUMMARY OF THE INVENTION

The present invention is a solution to the problem of leaking seals in rechargeable electrochemical cells. The solution is an improved seal design that takes greatest advantage of amorphous polymers such as polysulfone as a seal element material. The design includes a seal element geometry that cannot be created by cold forming a polysulfone seal element around a cover plate. In order to create the required seal geometry in a polysulfone seal element, a preformed seal assembly is constructed. The seal assembly is formed by initially molding the seal element about a cell cover plate. Typical insert-molding methods are used, although other methods are also available. During molding of the seal element, the cover plate is captured between a seal flange and a seal element shoulder portion formed against the inner side of the cover plate. The seal flange and shoulder have an increased radial dimension in order to form an extended leakage path from one side of the cover plate to the other. A consequence of this construction is that the cover plate may not be removed from the assembly—the radial dimension of the flange and shoulder create too great an interference. Similarly, a cover plate could not be introduced into such a seal element if one having this geometry were formed separately from the cover plate. Another advantage of the present design is the formation of a seal flange with a very small axial dimension. This helps to reduce the overall axial dimension of the nonactive cell elements and improves cell capacity. The seal flange axial thickness in a preferred configuration is less than the dimension of the seal element from the cover plate perimeter to the container wall. During assembly of a cell, the seal assembly is introduced as a unit to the cell container. The cover plate is located within the cell by a shoulder or shelf of the seal element. The seal assembly is held in place by bending the container wall over the edge of the assembly. The seal flange separates the wall flange that is bent over from the cover plate (which is typically oppositely charged). The wall flange is biased axially toward the cover plate to axially compress the seal flange. The seal element shoulder is likewise axially compressed. The wall flange is permanently deformed such that the axial compression is retained for the life of the cell. A sidewall portion of the seal element extends radially outward from the cover plate perimeter. This sidewall portion is radially compressed between the cover plate and a portion of the container wall. The combined axial and radial compression of the seal element results in improved long-term resistance to leakage. In preferred embodiments, the seal element sidewall portion is compressed about 25 to 30 percent of its unloaded radial thickness and the seal flange is axially compressed about 10 percent of its axial thickness. Because the seal element geometry is preformed and is not due to cold forming during cell assembly, desired seal geometries are obtained in the most desired seal materials —polysulfone.

The present invention provides a novel seal design, seal assembly, and methods of cell fabrication that gain the combined benefits of a preferred seal geometry and preferred seal materials that are otherwise unavailable. As an improved method of fabricating cells, the invention gives commercial advantages in reducing the number of parts handled and reducing processing errors. The advantages and manner of making and using the present invention is detailed more completely in the following drawings, description and claims.

DESCRIPTION OF THE PREFERRED EMBODIMENTS

Figure 1:
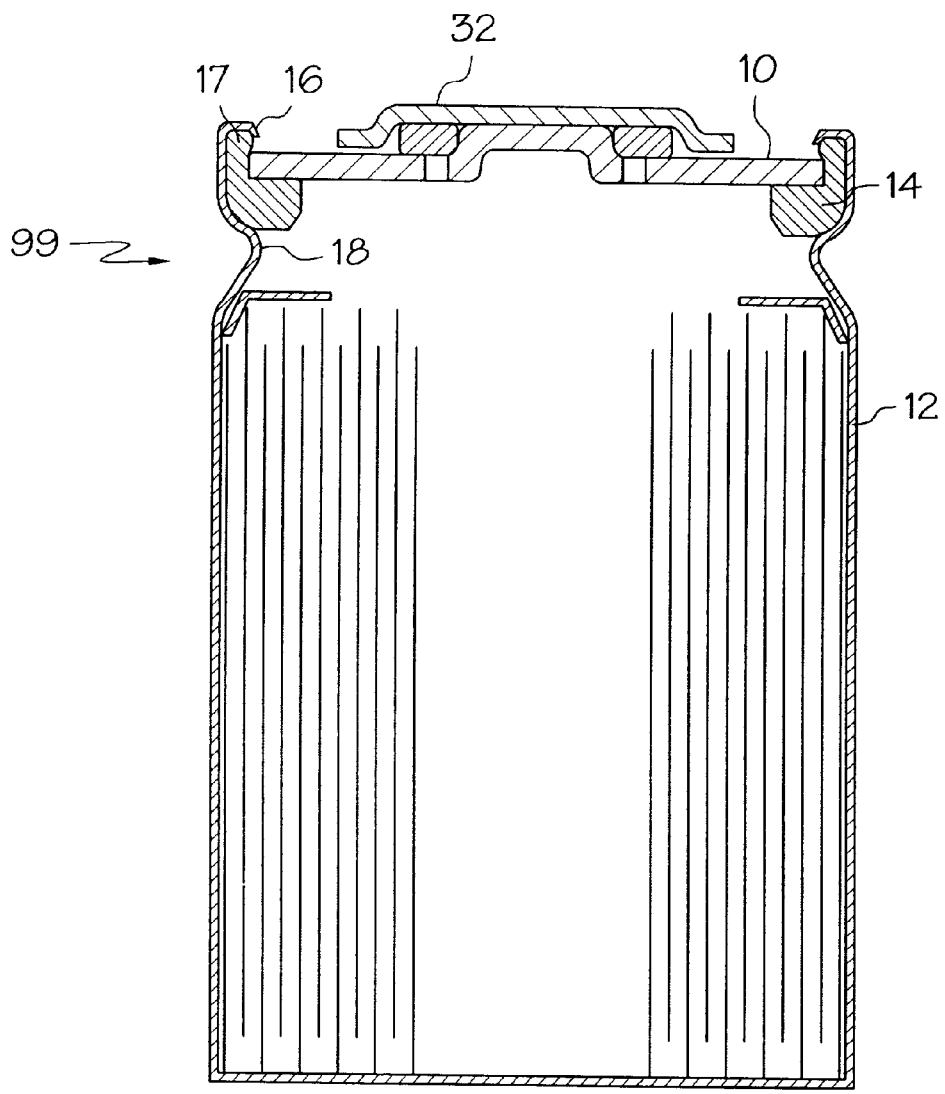
FIG. 1 is a cross-section view of an electrochemical cell including a seal according to the prior art.

FIG. 1 is an example of an electrochemical cell including a seal according to the prior art. A cover plate 10 resides in the open end of a cylindrical cell container 99. Between the relatively rigid cover plate 10 and container wall 12 is a deformable seal element 14 that helps to prevent leakage of the contents of the container 99 past the cover plate 10. The container has a circumferential indentation 18 that locates the seal element 14. To capture the cover plate 10 and seal element 14 in place, the end of the container wall 12 is bent over to form a lip 16. In various cell designs, during the bending of the lip 16, a protruding portion 17 of seal element 14 is crushed over the edge of the cover plate 10. This portion of the seal element spatially separates the lip 16 from the cover plate 10 that are oppositely charged in an operational cell. A part of the container wall is also deformed in a radial direction, compressing the seal element 14 between the container wall 12 and the cover plate 10. Examples of these devices and methods are provided in U.S. Pat. Nos. 4,523,376 to Thibault et al. and 4,822, 377 to Wolff.

Figure 2:
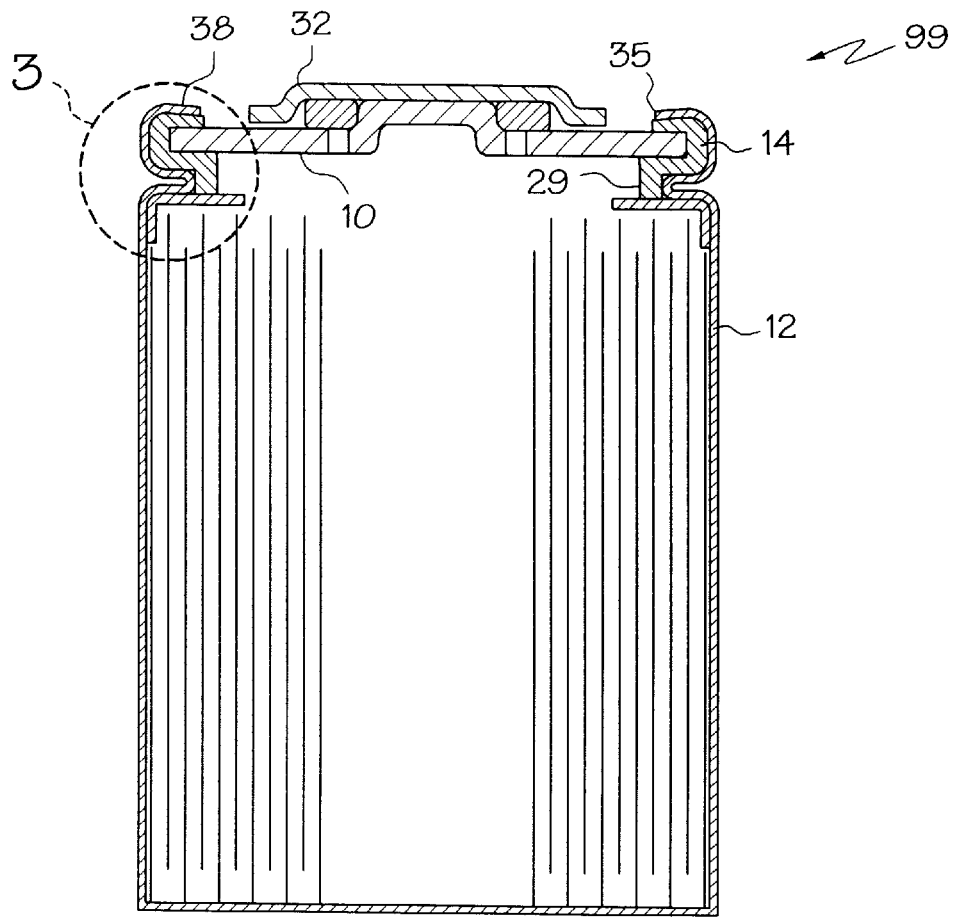
FIG. 2 is a cross-section view of a cell including one embodiment of a seal according to the present invention.
Figure 3:
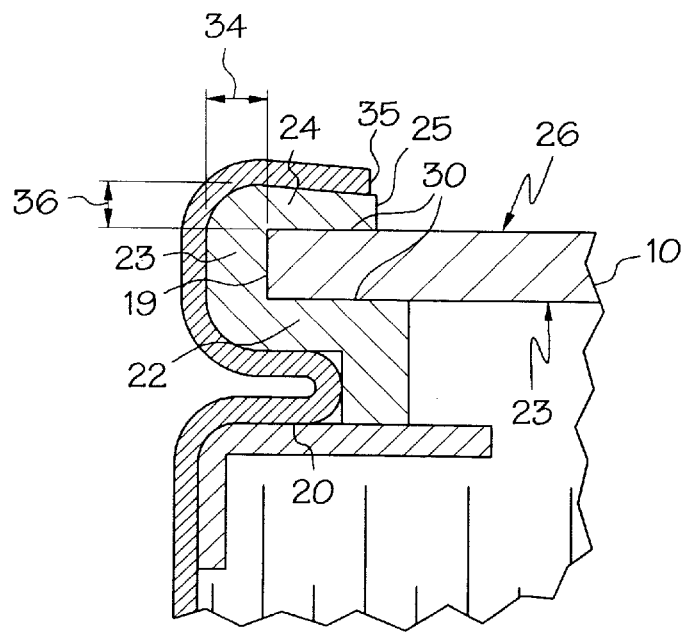
FIG. 3 is an enlarged detail of the seal and seal elements of FIG. 2.

FIGS. 2 and 3 depict, in cross section, the details of one embodiment of the present invention in an electrochemical cell. As in the prior art, a generally disk shaped cover plate 10 is surrounded at its circular perimeter 19 by a generally toroidal seal element 14 within the open end of a cell container 99. The seal element 14 and cover plate 10 are located axially by interference with a shelf 20 formed in the container wall 12. The seal element 14 includes a shoulder 22, sidewall portion 23 and seal flange 24. Preferably, the cross section of each of these is unchanging circumferentially. The sidewall portion 23 extends radially from the perimeter 19 of the cover plate 10 to the container wall 12 and has axial thickness. Extending from the sidewall portion 23 on one side is the seal flange 24 which is in contact with the flat outer side 26 of the cover plate 10. From the other side of the sidewall portion 23, a shoulder 22 extends radially inward and in contact with the cover plate 10 along a flat inner side 28. A leg portion 29 extends downward from the shoulder 22, and is used for positioning the seal element 14 in the cell. The leg portion 29 is not essential to the function of the seal and is provided for convenience during assembly. The contact surfaces between the sidewall portion 23, shoulder 22 and seal flange 24 and the cover plate 10 form a continuous interface or seal path 30. The container wall 12 extends from the shelf to encompass the sidewall portion 23 and is bent at the end over the seal flange 24. A venting function is achieved by the interaction of the cover plate 10 with a button 32, and other vent elements, as shown in FIGS. 1 and 2. These structures are representative of many venting devices used in such cells.

The fluid contents of an electrochemical cell leak primarily along interfaces such as the seal path 30. A second seal path exists between the seal element 14 and the container wall 12. However, due to factors such as the comparatively long length of this path, leakage along this interface is not as problematic. As used herein the term "seal" used alone means either the combination of functional elements that affect a separation or isolation of one area, or the act of separating or isolating. "Seal" is also used herein in combination with other terms to indicate specific structures used to create a seal. To decrease leakage, it is preferred that the seal path 30 be as long as possible. To lengthen the seal path 30, the seal flange 24 extends radially inward to a seal flange inner perimeter 25 on the cover plate outer side 26. To prevent inadvertent conduction from the container wall 12 to the cover plate 10, the seal flange extends radially beyond the wall flange inner perimeter 35. That is, the seal flange inner perimeter 25 has a smaller radius than the wall flange inner perimeter 35 (with respect to a common centerline). Electrical isolation by spatial separation as shown in FIG. 1 (air as the insulator) is susceptible to shorting from incidental contact with other objects or debris. Because the present seal flange 24 provides positive material insulation, and therefore the wall flange 38 need not be spatially isolated from the cover plate 10, a lower profile assembly is possible.

Industry standards for many cells specify a minimum distance that the cover plate button 32 project axially above the end of the container wall 12. At the same time, the overall lengths of the cells are also fixed by standards. Various methods are contemplated for reducing the profile of the cell vent structures, such as the button 32, in order to increase the usable cell volume and hence capacity. However, without also reducing the container wall axial dimension, the improvements in button geometry cannot be implemented and still satisfy industry button projection specifications. By reducing the seal element axial dimension outside the cover plate, and by that reducing the distance the container wall projects past the cover plate, the button 32 axial dimensions may be reduced and still meet the button projection specification. The result is increased available space for the energy storage elements of the cell.

To decrease leakage through the seal path 30, the portions of the seal element 14 forming the interface are maintained under compressive stress during the useful life of the cell. The sidewall portion 23 is radially compressed due to the adjacent container wall 12 being biased radially inward toward the cover plate 10. The sidewall portion 23, seal flange 24 and shoulder 22 are also compressed due to the wall flange 38 being biased axially toward the shelf 20. The biasing of the container wall is accomplished by developing permanent residual stresses in the wall as a consequence of forming operations in which the gross dimensions of the container wall are reduced. The manner of these operations are well known and typical methods are discussed in the above referenced patents to Thibault. By providing an extended seal flange 24 and establishing axially compressive stresses within, the effective leak-resisting length of the seal path 30 is increased. Because a substantial portion of the seal element is held in compression, relaxation from cold flow is less likely during cell life.

The required radial compression of the sidewall portion is approximately 25 to 30 percent of the unloaded thickness. Due to the lower stiffness of the wall flange 38 axial compression of the seal flange 24 is more difficult to maintain. However, with the geometry shown an axial compression of about 10 percent of the unloaded seal flange thickness was found effective. The required compression for effective sealing is dependent upon the seal element material. The values above are for a polysulfone seal element and are less than are typically necessary with nylon or other crystalline polymer seal elements. This is in part due to polysulfone's ability to maintain high levels of compression without cold-flow leading to relaxation.

Selection of the proper materials for forming the seal element 14 is important to minimizing leakage. The preferred seal element material is an amorphous polymer, most preferably the high-strength thermoplastic polysulfone. A seal material must be inert with respect to the liquid mediums contained by the seal. Polysulfone is resistant to oxidation and hydrolysis, alkali and salt solutions, common electrolyte solutions, and hydrocarbon oils. Seal materials should have high strength and low creep to sustain compression. It is in part the amorphous nature of polysulfone which gives it the ability to sustain seal compression without creep or cold flow. Tests have demonstrated that polysulfone seal elements compressed up to 50 percent of their unloaded thickness lose very little compression over extended periods of time. "Amorphous" as used herein means a material that is substantially without crystalline structure. Commercially available bulk polysulfone resins may include insubstantial regions of crystallinity. As well, minimal regions of crystallinity may result from the thermal history of the material when polysulfone is processed into articles. However, these amounts of crystallinity do not significantly affect the properties desired in the present invention. The desired seal material properties are demonstrated in at least two commercially available sources of bulk polysulfone. One is the product known as Ultrason™ S2010 available from the BASF Corporation. The second is available from Amoco Performance Products Inc. as a product referred to as UDEL®P1700 polysulfone.

Figure 4:
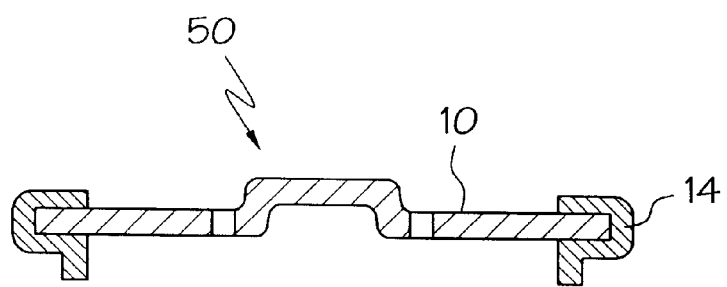
FIG. 4 is a cross-section view of an integrated seal and cover plate assembly.

The geometry depicted in FIGS. 2 and 3 cannot be achieved using polysulfone with the methods discussed above respecting the prior art. Due to the properties of polysulfone (high strength—low flow), the thin and extended seal flange 24 cannot be formed by crushing a protruding portion of the seal element as depicted in FIG. 1. This problem is resolved by molding the seal flange shape prior to assembly. Many prior art seal elements are produced by injection molding or a similar process. However, inserting a cover plate into a seal element 14 is not possible after it is formed with the preferred geometry. The radial dimensions of the seal flange 24 and shoulder 22 create interferences that do not allow insertion of the cover plate 10. Bending or flexing the seal element 14 will not provide a path for this purpose. To resolve this problem, the seal element 14 is molded around a cover plate 10 in a process known as insert molding. In insert molding, an insert (the cover plate) is entered into the mold prior to introduction of the molding medium. The insert is then captured within the molded part. The result is a unitized seal assembly 50 (FIG. 4) consisting of the combined seal element 14 and cover plate 10. As used here "molding" is considered an operation wherein a seal material is initially in a fluid state due to temperature, pressure, chemical action or other processes. After entering a mold, the material solidifies as a consequence of changes in these conditions or states. General methods of molding products from polysulfone are available and typical process parameters are available from suppliers of the bulk material. There are several advantages to this method of fabrication. First, an optimum geometry can be obtained in polysulfone, avoiding the necessity of deforming the seal element during assembly to shape the part. Second, a much thinner seal flange 24 can be formed by preforming in a mold. A thinner seal flange helps to enable a lower profile assembly. The seal flange thickness 36 is preferably as small as possible while still capable of forming a retaining axial compression. The seal flange thickness 36 may vary over the seal flange radial dimension. In that case, the seal flange thickness considered herein is the average thickness. In the embodiment shown in the figures, the nominal seal flange thickness is approximately 0.015 inch (0.38 mm) which is less than the sidewall radial thickness of 0.025 inch (0.63 mm). As a result, the container wall 12 can be bent flat over the seal element 14 in little total axial dimension. Third, a seal assembly consisting of a seal element and cover plate reduces the number of parts handled during assembly, reducing fabrication costs. The manner of assembling such a seal assembly into a cell is much the same as when using separate parts. However, potential problems with improperly placed cover plates are eliminated. Losses due to dropped or mishandled parts are also reduced. Alternative processes for forming a seal assembly as described above will be obvious to those skilled in such methods. What is essential is that the geometry of the seal element be determined upon initial formation of the seal element and not dependent upon processing during cell assembly.

The nonactive cell components in cells incorporating the present seal are formed of materials typically used in electrochemical cells. The container wall and cover plate are formed of nickel-plated steel alloys or other conductive alloys known for the purpose. The container wall thickness must be sufficient to retain sufficient compression in the seal element. Typical container thicknesses of about 0.010 inch (0.25 mm) are generally adequate. The teachings of Thibault et al. in U.S. Pat. No. 4,523,376 are incorporated herein by reference particularly for background on polysulfone as a seal material and details of forming operations in assembly of cell containers.

Variations of seal element 14 geometry may be used to carry out the concepts illustrated by the above examples. The concept of a preformed seal flange axially compressed on the outer surface of a cover plate provides, in combination with traditional radial seal compression, a seal path with increased resistance to leakage. Because the seal geometry is entirely determined by molding, polysulfone is made available as the seal material. This combination of features results in a more effective seal that is easily and cheaply incorporated in commercial electrochemical cells. Although the above discussion was made in the context of rechargeable cells, the same devices and methods are contemplated in conjunction with other cells such as primary electrochemical cells having similar structures and requirement. Similarly, the above devices and methods may be used beneficially in the construction of other electronic and electrical devices such as capacitors.

The preceding discussion is provided for example only. Other variations of the claimed inventive concepts will be obvious to those skilled in the art. Adaptation or incorporation of known alternative devices and materials, present and future is also contemplated. The intended scope of the invention is defined by the following claims.

I claim:

1. A method of sealing electrochemical cells to reduce cell leakage from internal pressure, the method comprising:

forming an amorphous polymer seal material, having the properties of low creep and being inert, about a circular cover plate, creating:

a sidewall portion extending radially outward a radial thickness from the cover plate perimeter, a seal flange extending from the sidewall portion and disposed against a cover plate first side, a shoulder extending from the sidewall portion and disposed against the cover plate second side, after the step of forming an amorphous polymer seal material about the cover plate, introducing the cover plate into a container with the seal flange oriented toward the exterior of the container;

bending a wall flange portion of a container wall to capture the cover plate within the container, biasing the wall flange axially in the direction of the cover plate, thereby compressing the seal flange between the wall flange portion and the cover plate;

such as to form a leak resistant interface between the seal flange and the cover plate.

2. The method according to claim 1, wherein:

the seal material is polysulfone.

3. The method according to claim 2, wherein:

the seal flange is compressed at least 10 percent of its unloaded axial thickness.

4. The method according to claim 3, further comprising:

permanently deforming a portion of the container wall in the radial direction, compressing the sidewall portion between the container wall and the cover plate.

5. The method according to claim 4, wherein:

the sidewall portion is compressed about 25 to 30 percent of its unloaded radial thickness.

6. The method according to claim 5, wherein:

the seal flange is created having an axial thickness less than the sidewall portion radial thickness.

7. A method of sealing electrochemical cells to reduce cell leakage from internal pressure, the method comprising:

forming a polysulfone material about a circular cover plate creating:

a seal flange extending from the sidewall portion and disposed against a cover plate first side, a shoulder extending from the sidewall portion and disposed against the cover plate second side, a sidewall portion connecting the seal flange and shoulder;

after the step of forming a polysulfone material about the cover plate, introducing the cover plate into a container with the seal flange oriented toward the exterior of the container;

bending a wall flange portion of a container wall to capture the cover plate within the container, thereby biasing the wall flange axially in the direction of the cover plate to compress the seal flange between the wall flange portion and the cover plate sufficiently to form a leak resistant interface between the seal flange and the cover plate.

8. The method according to claim 7, further comprising:

permanently deforming a portion of a container wall in the radial direction, to compress the sidewall portion in the radial direction between the container wall and the cover plate.

\* \* \* \* \*